United States Patent [19]
Leftwich et al.

[11] 3,792,275
[45] Feb. 12, 1974

[54] INFRARED INTRUSION SENSOR

[75] Inventors: Richard F. Leftwich, Pound Ridge, N.Y.; Robert T. Ensor, Redding, Conn.

[73] Assignee: Barnes Engineering Company, Stamford, Conn.

[22] Filed: Dec. 26, 1972

[21] Appl. No.: 317,983

[52] U.S. Cl. ............... 250/338, 250/342, 250/344
[51] Int. Cl. ............................................. G01t 1/16
[58] Field of Search 250/344, 342, 338, 345; 350/1; 340/227, 278; 73/359, 355 R, 341

[56] References Cited
UNITED STATES PATENTS

| | | | |
|---|---|---|---|
| 2,392,873 | 1/1946 | Zahl | 250/342 |
| 2,198,725 | 4/1940 | Smith | 250/338 |
| 2,357,193 | 8/1944 | Harrison | 73/355 R |
| 1,988,858 | 1/1935 | Quereau | 73/355 R |
| 2,432,145 | 12/1947 | Evans | 340/228 R |

*Primary Examiner*—Harold A. Dixon
*Attorney, Agent, or Firm*—Joseph Levinson

[57] ABSTRACT

An infrared intrusion sensor is provided to detect a human target anywhere in a 20 × 20 foot area. A wide angle portrait-type lens of germanium is utilized to provide reasonably uniform imaging over the field of view of approximately 70° × 70°, while still focusing on a flat image plane. This allows the use of a flat, extended thermopile detector having all active junctions which are arranged in columns to cover the desired area, and connected so that the columns alternate in a positive-negative configuration. The detector junctions have different sizes and spacing, with the junction concentration being roughly inversely proportional to the square of the range.

7 Claims, 5 Drawing Figures

INFRARED INTRUSION SENSOR

BACKGROUND OF THE INVENTION

This invention relates to an infrared intrusion sensor and more particularly to an infrared system employing a simple single lens having a high refractive index for providing reasonably uniform imaging of a wide field of view on a flat thermopile detector configuration to adequately cover the field of view.

Radiation generated by the intruder is collected and picked up by a suitable detector and processed to provide an alarm. A number of such systems have been proposed or used, in which radiation from the field of view is imaged on a small detector utilizing a multifaceted mirror or the equivalent thereof. This approach limits the collecting aperture, since only one facet is collecting energy from a particular direction. A compromise must be made between number of facets and collecting aperture or sensitivity.

The detector in such a system, which in effect has radiation applied thereto by individual mirrored elements, sees only the point in the field of view imaged by that mirrored segment, making the imaging poor and limiting the number of elements which can be used, and cutting down the sensitivity of the system.

In an application, Ser. No. 209,660, entitled "Intrusion Detector," which is assigned to the assignee of the present invention, a wide field of view intrusion detector is provided by a single optical collector. The radiation collected thereby is applied to a thermopile detector which has a plurality of rows of thermocouples having all active junctions with alternate polarity, which are aligned in columns of the same polarity. The system responds to an object moving thereacross to produce an output signal of alternately changing polarity. The present invention is directed to improvements in this type of system, and particularly to the optical element in combination with the detector which forms the sensor.

SUMMARY OF THE INVENTION

It is an object of this invention to provide an improved infrared intrusion detector with high sensitivity over a wide field of view.

A further object of this invention is to provide an improved infrared intrusion sensor which is capable of detecting a human target anywhere in a 20 × 20 feet area utilizing a single lens and detector configuration.

In carrying out this invention in one illustrative embodiment thereof, a wide-angle, portrait-type lens having a high refractive index is utilized to provide reasonably uniform imaging over a wide field of view while focusing on a flat image plane. A flat extended thermopile detector is positioned on that flat image plane. The thermopile detector has a plurality of all-active junction thermocouples arranged in columns to fill the area covered, which thermocouples are connected to be alternately positive and negative-going. The thermocouple detector elements have a different spacing and size, with the greatest density and smallest elements being located where the greatest range is encountered and the greatest sensitivity required.

DESCRIPTION OF THE PREFERRED EMBODIMENT

Figure 1:
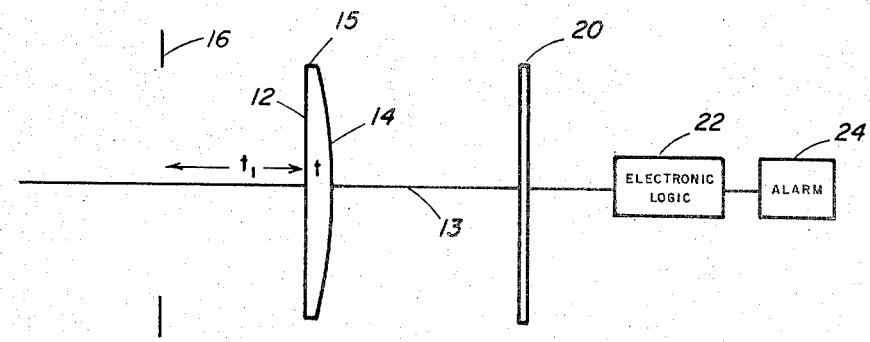
FIG. 1 is an optical schematic and electrical block diagram of an intrusion sensor system embodied in this invention.

The problem solved by the present invention is to provide a high-sensitivity infrared sensor to detect a human target anywhere in a 20 × 20 feet room where the sensor is mounted one foot below an 8 feet or 9 feet ceiling. This requires a field of approximately 70° × 70° on the X-Y axis, which will be somewhat smaller in the corners. The optics of the sensor must be able to focus a human target anywhere in the aforesaid field on a small, sensitive infrared detector. This is accomplished as shown diagrammatically in FIG. 1. A special wide-angle portrait-type lens 15 is provided with an aperture provided by the aperture stop 16. The lens 15 focuses on a flat image plane occupied by an extended flat detector 20, preferably in the form of an evaporated thermopile. Signals from the detector 20 are applied to electronic logic 22 which provides the function of amplifying and discriminating against unwanted signals, and applying the desired signals to the alarm 24. Various forms of logic alarms may be provided, such as those shown and described in the aforesaid application, and are not considered part of the present invention.

The lens 15 is used in an unconventional manner with a plano front surface 12, thus with an infinite radius forward, which maintains relatively uniform aberrations over the entire field of view at the expense of optimum imagery in the center only. The back surface 14 of the lens 15 is convex and brings the image of the field of view to a focus on the flat extended detector 20. To achieve high performance with a single lens element 15, a high index of refraction is required, and the lens is preferably made of germanium which has a refractive index of 4. The material of the lens 15 must uniformly image the infrared wavelengths normally emitted from the human body which are largely in the 8–14 micron region, which makes germanium an ideal selection. The germanium lens is provided with a 4-micron cut-on coating, thereby rejecting any signals from such sources as tungsten lamps and sunlight to help prevent false alarms. The cut-on coating also acts as an antireflection coating.

Figure 2:
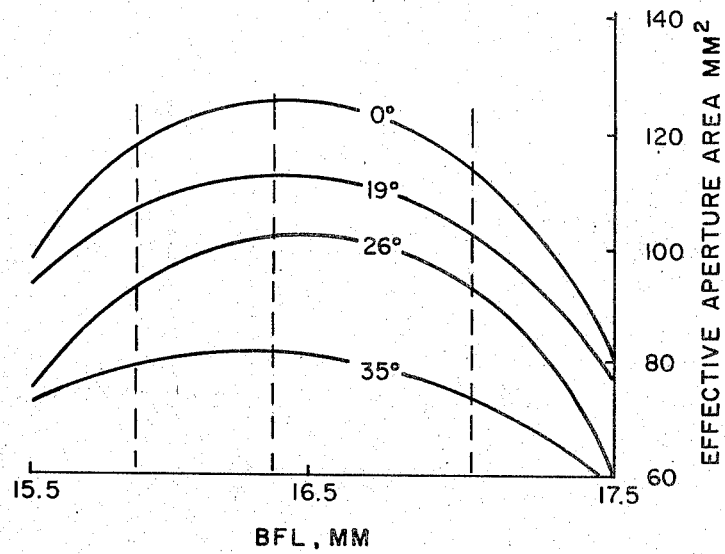
FIG. 2 is a graph of the aperture area versus focus for various angles of the field of view of the lens shown in FIG. 1.
Figure 3:
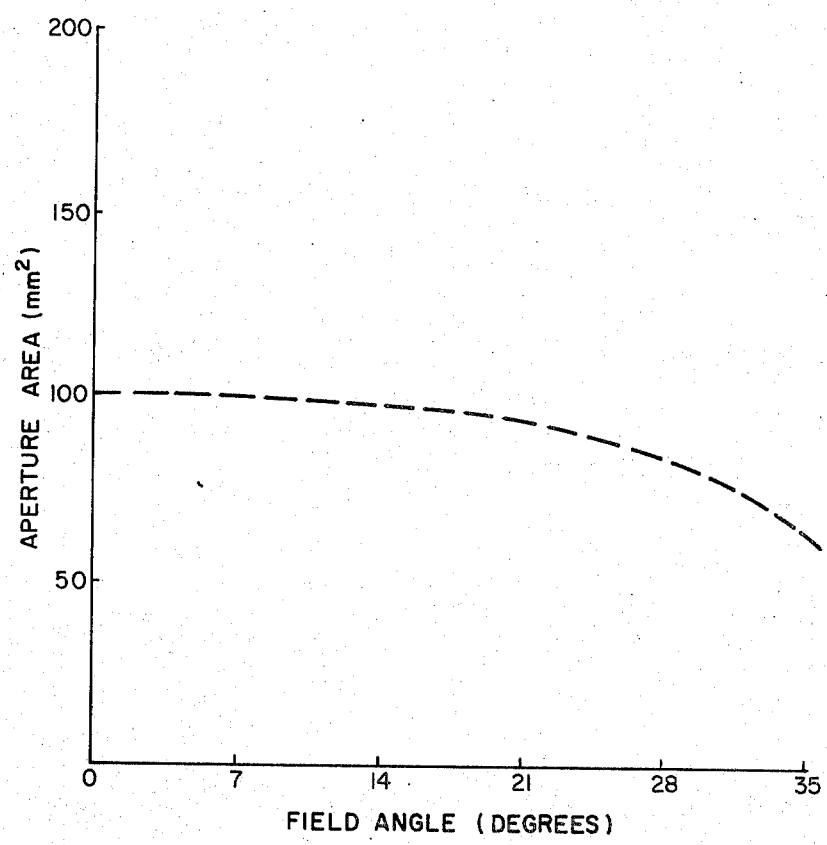
FIG. 3 is a graph of aperture area versus field angle for the lens shown in FIG. 1.

An important compromise was made in the lens 15 design to achieve maximum sensitivity at the greatest range, which would be about 30′ at the opposite room corner. The optical axis 13 of the lens 15 is arranged to approximate this maximum direction. Off-axis, the distance is necessarily smaller, never exceeding 20′ at the greatest angle. Since the signal from a human target is inversely proportional to the distance squared, the effective collecting area off-axis can be reduced by $(20/30 \text{ feet})^2$, or approximately 2:1. This was done to maximize sensitivity on-axis. The aperture area vs focus for a plurality of angles is shown in FIG. 2. The effective collecting or aperture area vs angle is shown in FIG. 3. The latter is shown for a 0.3 mm width, which is a typical best size for a sensitive thermopile detector junction. The lens 15 focal length is selected to image a 6 inches wide human face on this width. The lens f-number was then speeded up to better than f/0.9 to achieve maximum collecting area on-axis as described above. Merely as an illustrative example of one embodiment of this invention, the aperture stop 16 is 22 mm in diameter, the radius of convex surface 14 of the lens 15 is 54.8 mm, the distance $t_1$ from the aperture to the plano front surface 12 of the lens 15 being 12 ±1 mm, and the distance $t$ representing the thickness of the lens is 2.5 ±0.2 mm.

Figure 4:
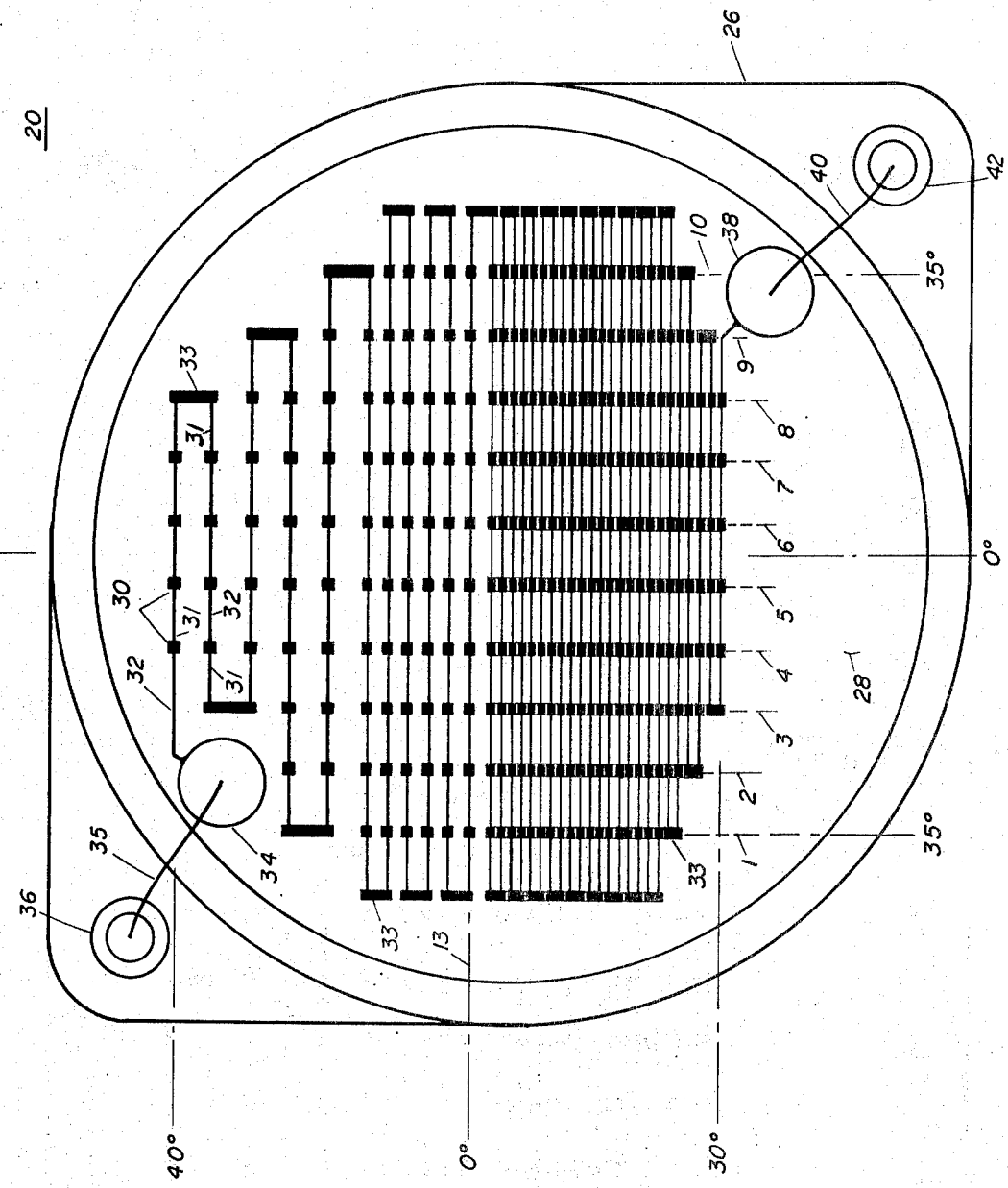
FIG. 4 shows the top view of the detector employed in the sensor shown in FIG. 1.

The preferable form of infrared detector for use in the present application is a thermopile detector. As will be seen in FIG. 4, the thermopile detector 20 is mounted on a base 26 and the thermopile is formed of a series of thermocouples of dissimilar metals 32 and 31 forming junctions 30 therebetween, which is blackened to enhance the response. It should be appreciated that the thermopile as it appears on the drawing is considerably out of scale, and is shown in diagrammatic form for ease of illustration. The metals 32 and 31 may be bismuth and antimony, or any other suitable thermocouple material. The thermocouple junctions 30 are formed on a substrate 28 of a thin insulating material, such as polyethylene terephthalate or other suitable material which is a good insulator and lends itself to deposit of metal thereon by evaporation techniques. The construction of the thermopile 20 is formed using conventional vacuum evaporation techniques on the substrate 28, and its construction differs from conventional thermopile construction in that all of the junctions are active, there being no reference junctions. With this construction, alternating polarities are set up across the row of thermocouples, and the thermopile 20 is arranged in 10 columns, one through 10, with each thermocouple in its respective column being of the same polarity. All of the thermocouple junctions 30 are serially connected between output terminals 34 and 38 with the rows being interconnected serially by the connector pad 33. The terminal pads 34 and 38 are connected via leads 35 and 40 to feed-through pins 36 and 42, respectively. With this type of construction, an object moving across columns 1–10 will generate alternate positive and negative pulses across the output leads 35 and 40, which signals can be processed to detect the presence of an intruder.

Figure 5:
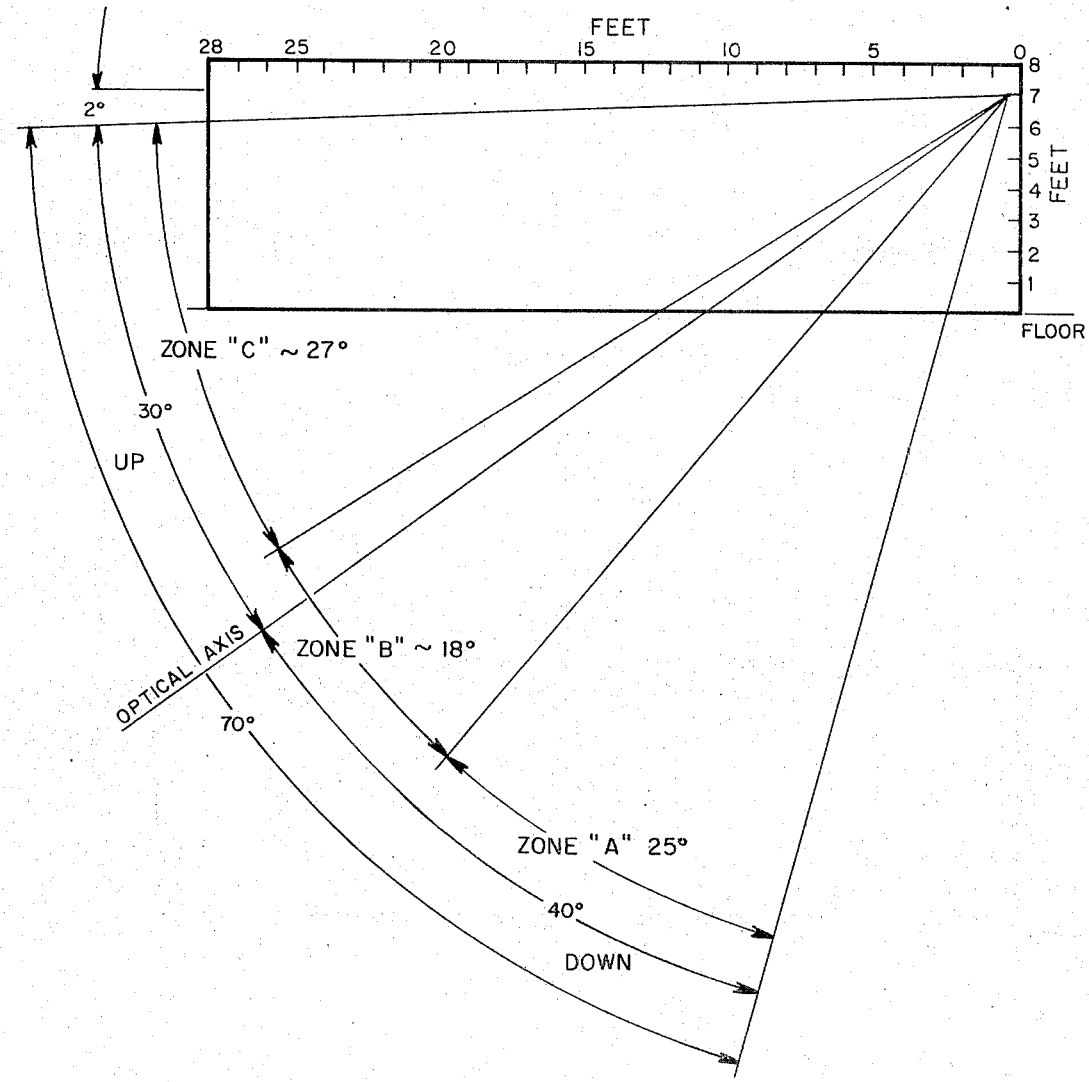
FIG. 5 is the diagram of the area which must be covered by the detector shown in FIG. 4.

The exact detector pattern to cover the desired area is determined with care. FIG. 5 shows the basis of that selection in which the 20 × 20 feet area is divided into zones A, B, and C covering the desired 70°. Zone C represents the farthest distance at the center, or the diagonal across the room, Zone B being the intermediate zone, and Zone A being directly under the sensor. As will be apparent from FIG. 5, the sensor looks out in a fan-shaped span and the detector must be designed to cover the entire area. To this end, and as will be seen in FIG. 4, 10 columns 1–10 are provided to avoid leaving open areas in the room. The columns are connected to be alternately positive and negative going so that alternate positive and negative signals are produced when an intruder proceeds across the columns. The greatest density and the smallest elements are placed where the greatest range is encountered and the greatest sensitivity needed, thus in Zone C. However, as the close range region is approached, underneath the optical head, the elements are larger and wider spaced. Also it should be noted that the corner junctions which are not needed to cover the room are eliminated. In this way, signal-to-noise ratio is maximized, since all junctions are connected in series, and fewer junctions mean less resistance and therefore less noise. Additionally, the junctions 30, and thus the sensitivity, are concentrated in the region Zone C, where they are needed most.

Merely by way of example, and illustrative of one embodiment, the following dimensions are given:

Zone A – 28 junctions, 0.3 mm width × 0.4 mm height.
Zone B – 59 junctions, 0.3 mm width × 0.3 mm height.
Zone C – 211 junctions, 0.3 mm width × 0.2 mm height.
Row separation in Zone A – 1.48 mm; Zone B – 0.9 mm; Zone C – 0.352 mm.
Total distance between rows – 20.9 mm.
Distance between columns 1 and 10 – 20.7 mm.

The use of the evaporated thermopile is beneficial because it has no power drain and is stable under DC conditions. It lends itself in construction due to the simplicity of evaporating large complicated extended patterns, and lends itself to ease of positive-negative hookup when used in the all-active-junction mode. The thermopiles' response is independent of ambient temperature, and also has excellent sensitivity to the infrared radiation generated by the human desired to be detected. With respect to construction, the entire pattern may be deposited using suitable masks on a flat surface by evaporation techniques. The use of a large field being covered by a single lens plus an extended flat detector provides greater coverage and better sensitivity than those systems using multifaceted mirrors and a single detector.

Since other modifications varied to fit particular operating requirements and environments will be apparent to those skilled in the art, this invention is not considered limited to the examples chosen for purposes of illustration, and covers all changes and modifications which do not constitute departures from the true spirit and scope of this invention.

We claim:

1. An infrared intrusion sensor for providing high sensitivity covering a wide field of view, comprising
    a. a wide angle lens having a high refractive index for providing reasonably uniform imaging over a wide field of view and being focused on a flat image plane,
    b. an extended flat infrared detector located on said flat image plane,
    c. said detector having a plurality of all active detector elements arranged in columns to fill the area covered which are connected to be alternately positive- and negative-going on being activated by an intruder,
    d. said detector elements having a different spacing and size with the greatest density and smallest elements being located where the greatest range is encountered and the greatest sensitivity required.

2. The infrared intrusion sensor set forth in claim 1 in which said wide angle lens is germanium.

3. The infrared intrusion sensor set forth in claim 1 wherein said lens has a plane front surface and a convex back surface.

4. The infrared intrusion sensor set forth in claim 1 wherein said infrared detector is a thermopile comprised of all active junction thermocouples.

5. The infrared intrusion sensor set forth in claim 4 wherein said all active junction thermocouples are serially interconnected.

6. The infrared intrusion sensor set forth in claim 1 wherein the area to be covered is divided into three zones with the close zone underneath the lens having detector elements which are larger and wider spaced, with size and spacing being reduced and the number of elements increased in the next immediate zone, and the spacing and size reduced further and the number of elements being substantially increased in the zone farthest distance from said lens.

7. The infrared intrusion sensor set forth in claim 1 wherein the concentration of detector elements is roughly inversely proportional to the square of the range.

* * * * *